United States Patent [19]
Makita

[11] Patent Number: 4,758,865
[45] Date of Patent: Jul. 19, 1988

[54] MAGNIFICATION SELECTING DEVICE FOR A COPIER

[75] Inventor: Katsuhiko Makita, Yokohama, Japan

[73] Assignee: Ricoh Company, Ltd., Tokyo, Japan

[21] Appl. No.: 86,941

[22] Filed: Aug. 17, 1987

[30] Foreign Application Priority Data

Aug. 28, 1986 [JP] Japan ............................... 61-200063

[51] Int. Cl.⁴ ............................................... G03B 27/52
[52] U.S. Cl. .................................... 355/55; 355/14 R
[58] Field of Search .................. 355/3 R, 3 SH, 14 R, 355/14 SH, 55, 56, 57

[56] References Cited

U.S. PATENT DOCUMENTS 4,552,453 11/1985 Iwamoto et al. ..................... 355/57
4,575,227 3/1986 Ito et al. ............................... 355/56
4,615,611 10/1986 Yoshiura .......................... 355/55 X
4,644,499 2/1987 Shibazaki et al. ................ 355/55 X
4,657,380 4/1987 Hamano et al. .............. 355/14 R X
4,669,858 6/1987 Ito et al. .......................... 355/55 X
4,682,877 7/1987 Fujiwara et al. .................. 355/3 R
4,697,917 10/1987 Takano et al. ..................... 355/14 R

*Primary Examiner*—Richard A. Wintercorn
*Attorney, Agent, or Firm*—Oblon, Fisher, Spivak, McClelland & Maier

[57] ABSTRACT

A device installed in a copier for selecting a magnification allows an operator to select a desired magnification by performing only a small number of manipulations which are predetermined on the basis of the format of paper sheets. This frees the operator from troublesome button selection and allows him or her to rapidly select a magnification with respect to different definite formats.

1 Claim, 7 Drawing Sheets

MAGNIFICATION SELECTING DEVICE FOR A COPIER

BACKGROUND OF THE INVENTION

The present invention relates to a device installed in a copier for selecting a magnification.

Two different kinds of devices are available for the selection of a magnification, as well known in the art. In one of them, a plurality of magnifications which vary stepwise are set beforehand so that any one of them may be selected by an operator at the time of copying operation. Since it is a common practice to copy documents of definite formats on paper sheets of definite formats, the above-mentioned stepwise magnifications, or fixed magnifications, are often set in terms of ratios between the definite formats. For example, assuming documents and paper sheets which belong to an A and a B format series, fixed magnifications may be predetermined as shown in Table 1 below.

TABLE 1

| PAPER | DOCUMENT A3 | A4 | A5 | B4 | B5 |
|---|---|---|---|---|---|
| A3 | 1.000 | 1.414 | 2.000 | 1.154 | 1.632 |
| A4 | 0.707 | 1.000 | 1.414 | 0.816 | 1.154 |
| A5 | 0.500 | 0.707 | 1.000 | 0.576 | 0.813 |
| B4 | 0.865 | 1.224 | 1.733 | 1.000 | 0.576 |
| B5 | 0.612 | 0.865 | 1.224 | 0.706 | 1.000 |

A3 297 × 420 mm
A4 210 × 297 mm
A5 148 × 210 mm
B4 257 × 364 mm
B5 182 × 257 mm

As shown in Table 1, when a document of format A3 is to be copied on a paper sheet of format A4, the magnification is 0.707. Likewise, when a document of format B4 is to be copied on a paper sheet of format A3, the magnification is 1. 154.

Another format system commonly adopted includes a letter (LT) size, a legal (LG) size, a double letter (DLT) size, and a half-letter (HLT) size. For such a format system, fixed magifications shown in Table 2 below may be contemplated.

TABLE 2

| PAPER | DOCUMENT LT | LG | DLT | HLT |
|---|---|---|---|---|
| LT | 1.000 | 0.786 | 0.647 | 1.294 |
| LG | 1.000 | 1.000 | 0.773 | 1.545 |
| DLT | 1.294 | 1.214 | 1.000 | 2.000 |
| HLT | 0.647 | 0.607 | 0.500 | 1.000 |

LT LETTER 8½" × 11" (inch)
LG LEGAL 8½" × 14"
DLT DOUBLE-LETTER 11" × 17"
HLT HALF-LETTER 5½" × 8½"

The prior art device of the type having some stepwise fixed magnifications as stated above involves difficulty in practical use, however. Specifically, in order that all of the fixed magnifications such as those shown in Table 1 or 2 may be selectively set up, a different button which corresponds to each magnification has to be provided on an operation board of a copier. In addition, it is troublesome for a person to select a particular button out of such a great number of buttons.

The other type of prior art magnification selecting device allows the magnification to be changed continuously in a stepless fashion. Although this type of device eliminates the need for numerous buttons as discussed above and frees a person from troublesome button selection, it brings about another drawback that a person has to accurately set up such precise magnifications as those shown in Table 1 or 2 in the event of a change of magnification between definite formats. Usually, therefore, stepwise magnifications are preferred rather than stepless magnifications.

SUMMARY OF THE INVENTION

It is, therefore, an object of the present invention to provide a magnification selecting device for a copier which does not need any troublesome button operation and, yet, allows a magnification to be raidly selected with respect to different definite formats.

It is another object of the present invention to provide a generally improved magnification selecting device.

A magnification selecting device for a copier of the present invention comprises a sheet format detecting means for detecting a format of paper sheets which are loaded in the copier, a magnification storing means for storing a plurality of different kinds of fixed magnifications which individually correspond to different formats of paper sheets, a magnification selection control means for selecting the fixed magnifications corresponding to a particular format of sheets out of the magnification storing means, based on sheet format information which is fed from the sheet size detecting means, and a magnification change switch for commanding a copying operation based on one of the fixed magnifications which are selected by the magnification selection control means.

The above and other objects, features and advantages of the present invention will become more apparent from the following detailed description taken with the accompanying drawings.

DESCRIPTION OF THE PREFERRED EMBODIMENT

Figure 1:
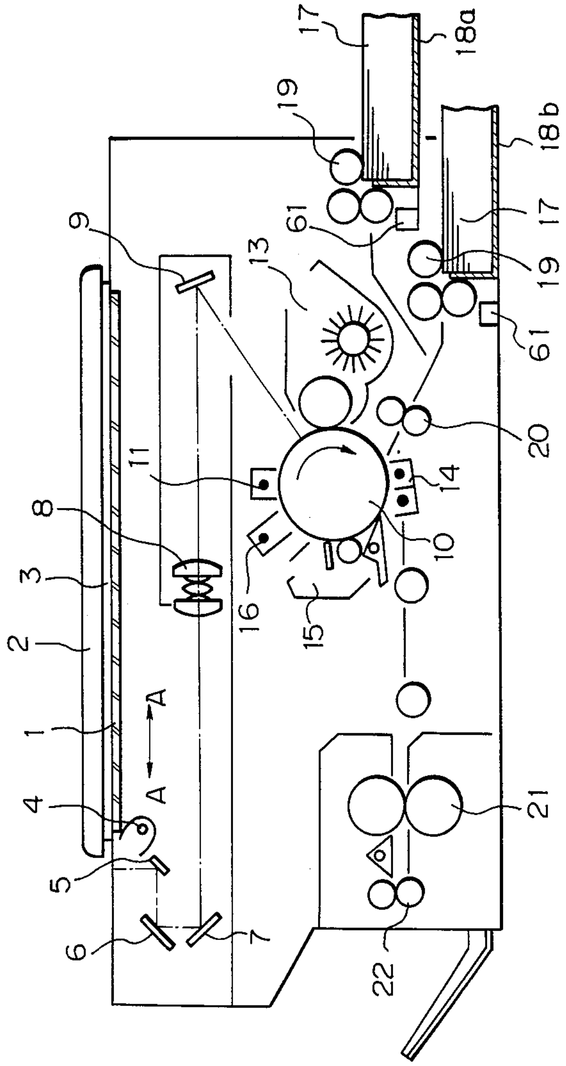
FIG. 1 is a sectional side elevation of a copier in which a magnification selecting device embodying the present invention is installed.

Referring to FIG. 1 of the drawings, a copier using a magnification selecting device in accordance with the present invention is shown. As shown, a document 3 is laid on a glass platen 1 face down and pressed from the above by a cover plate 2. A scanning unit movable in a direction indicated by an arrow A—A, i.e., a lamp 4, mirrors 5, 6, 7 and 9, and a lens 8 illuminate the document 3, and a light image from the document 3 is focused on the surface of a photoconductive drum 10 whose surface has been uniformly charged by a charger 11. As a result, a latent image corresponding to an image of the document is electrostatically formed on the surface of the drum 11. The latent image is developed by a developing unit 13 to become visible.

In the meantime, a paper sheet 17 is fed from any of sheet cassettes 18*a* and 18*b* toward the transfer charger 14 by feed rollers 19 and register rollers 20. Then, the paper sheet 17 is superposed on the visible image which is provided on the drum 10. Subsequently, a transfer charger 14 is activated to tranfer the visible image from the drum 10 to the paper sheet 17. The paper sheet 17 with the visible image is separated from the drum 10, then fed to fixing rollers 21 for fixing the image thereon, and then driven out of the copier by discharge rollers 22 to become a copy. On the other hand, the drum 10 is cleaned by a cleaning unit 15, then discharged by a lamp 16, and then charged again by the charger 11 to be prepared for another copying cycle.

Figure 2:
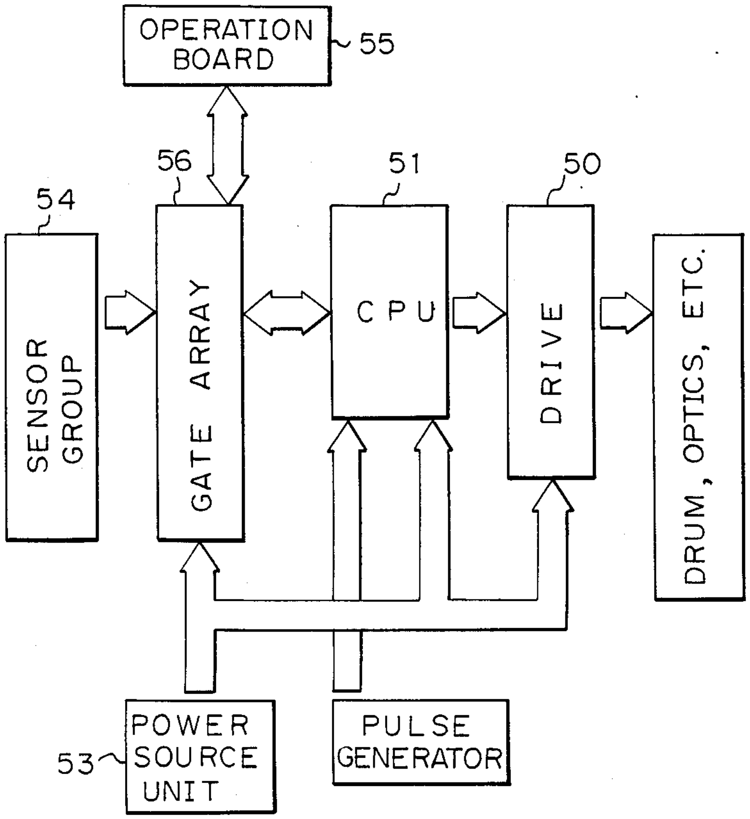
FIG. 2 is a block diagram showing a control system which is built in the copier of FIG. 1.

As shown in FIG. 2, the copying process discussed above is effected in response to commands which are produced by a CPU (Central Processing Unit) 51 by way of a drive stage 50, which is made up of a transistor array and others. For the copying process control, the CPU 51 is clocked by timing pulses which are generated by a pulse generator 52. Power is supplied to the various sections of the copier by a power source unit 53. A sensor group 54 is representative of various sensors, not shown, which are located at various portions of the copier of FIG. 1. Those sensors serve as input sections for allowing the CPU 51 to perform the copying process control. The outputs of the sensor group 54 are routed to the CPU 51 via a gate array 56. An operation board 55 includes various key switches such as shown in FIG. 3.

Figure 3:
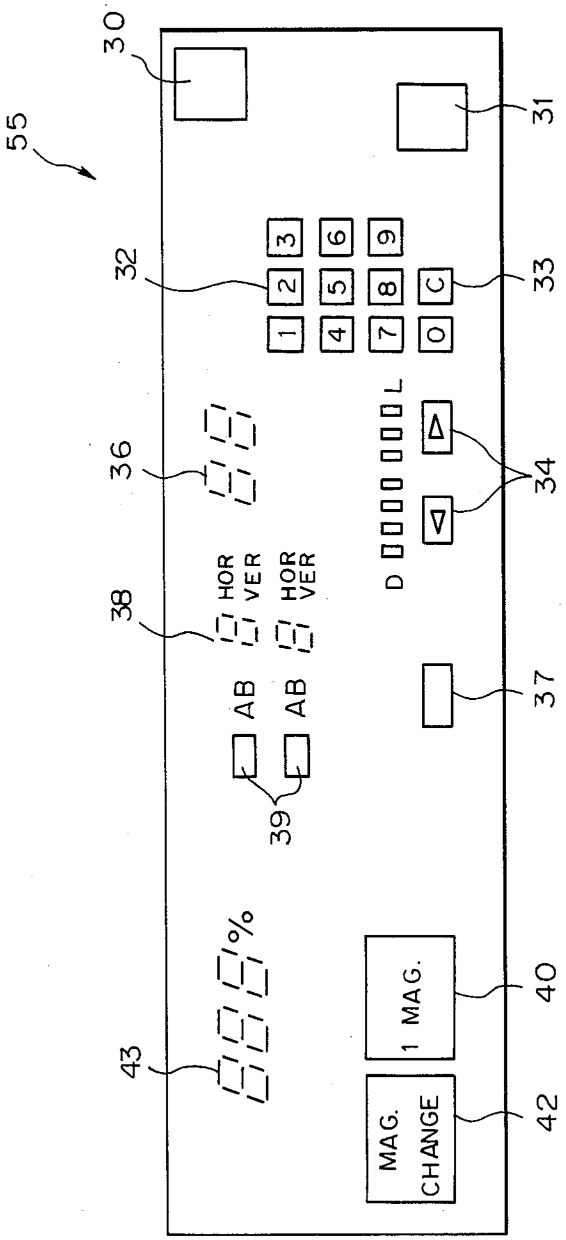
FIG. 3 is a view showing a specific arrangement of an operation board which is included in FIG. 2.

In the specific arrangement of operation board 55 shown in FIG. 3, a power switch 30 is provided for feeding power to a power source section, not shown, of the copier. A print button 31 may be operated to enter a command for starting the previously stated copying process. Numeral keys 32 are adapted to enter a desired number of copies. The number entered through the numeral keys 32 may be cleared by a clear key 33. A density key 34 is adapted to adjust the density of copies, and a density indicator 35 is adapted to display a selected density. The number of copies selected through the numeral keys 32 appears on a display 36. A sheet select key 37 may be operated to select either one of the upper and lower sheet cassettes 18*a* and 18*b*, FIG. 1, the sheet cassette selected being indicated by a display 39. A display section 38 serves to show the format of paper sheets which are loaded in the sheet cassette 18*a* or 18*b*.

The copier to which this particular embodiment pertains has a variable magnification copying function, i.e., it is capable of copying the image of the document 3 in an enlarged size or a reduced size as desired. To change a magnification, the position of scanning system such as the lens 8 and, therefore, the dimensions of a light image focused on the drum 10 is changed. A magnification change key 42 shown in FIG. 3 is adapted to enter a command for changing magnification, a magnification entered appearing on a display 43. The reference numeral 40 designates a 1 magnification key which may be depressed to produce a copy image having the same dimensions as a document image.

A specific control procedure over the copying operation with a magnification other than 1 will be described.

Generally, once the format of paper sheets is determined, only several different magnifications are needed in practice which correspond to the format of a document, as seen from Table 1 or 2. For example, assuming that the format of paper sheets selected is A3, magnification values needed in practice are 1. 414, 2. 000, 1. 154 and 1. 632; assuming that it is B4, then necessary magnifications are 0. 865, 1. 224, 1. 733, and 0. 567. Stated another way, once the format of paper sheets is determined, magnification values other than some (in Table 1, four magnification values) which correspond to the sheet format are needless. In the light of this, this embodiment considers only those magnification values which would be needed for a particular sheet format while discarding the others, thereby simplifying the procedure for the selection of a magnification.

Figure 4:
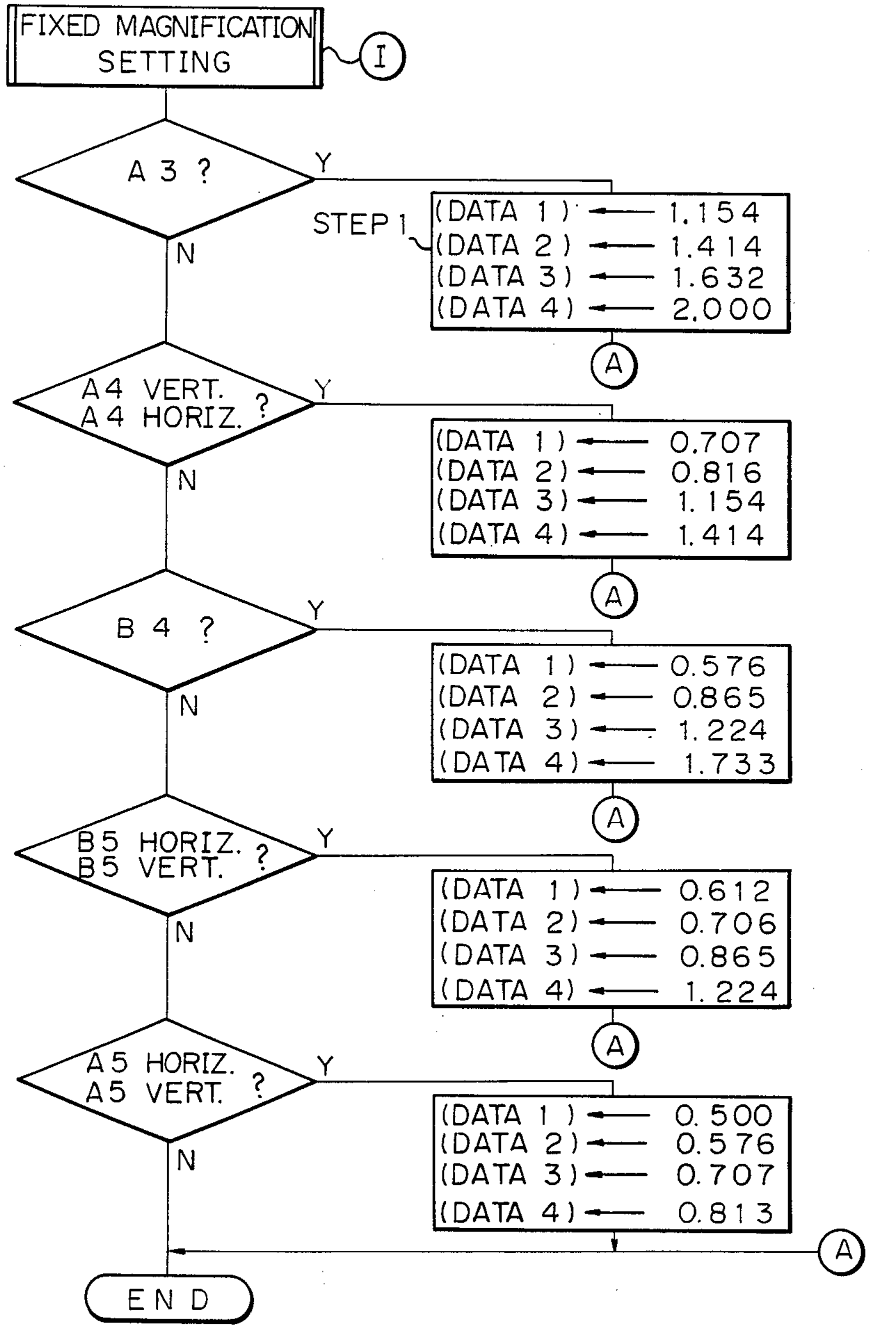
FIG. 4 is a flowchart demonstrating an operation for setting fixed magnifications.
Figure 5:
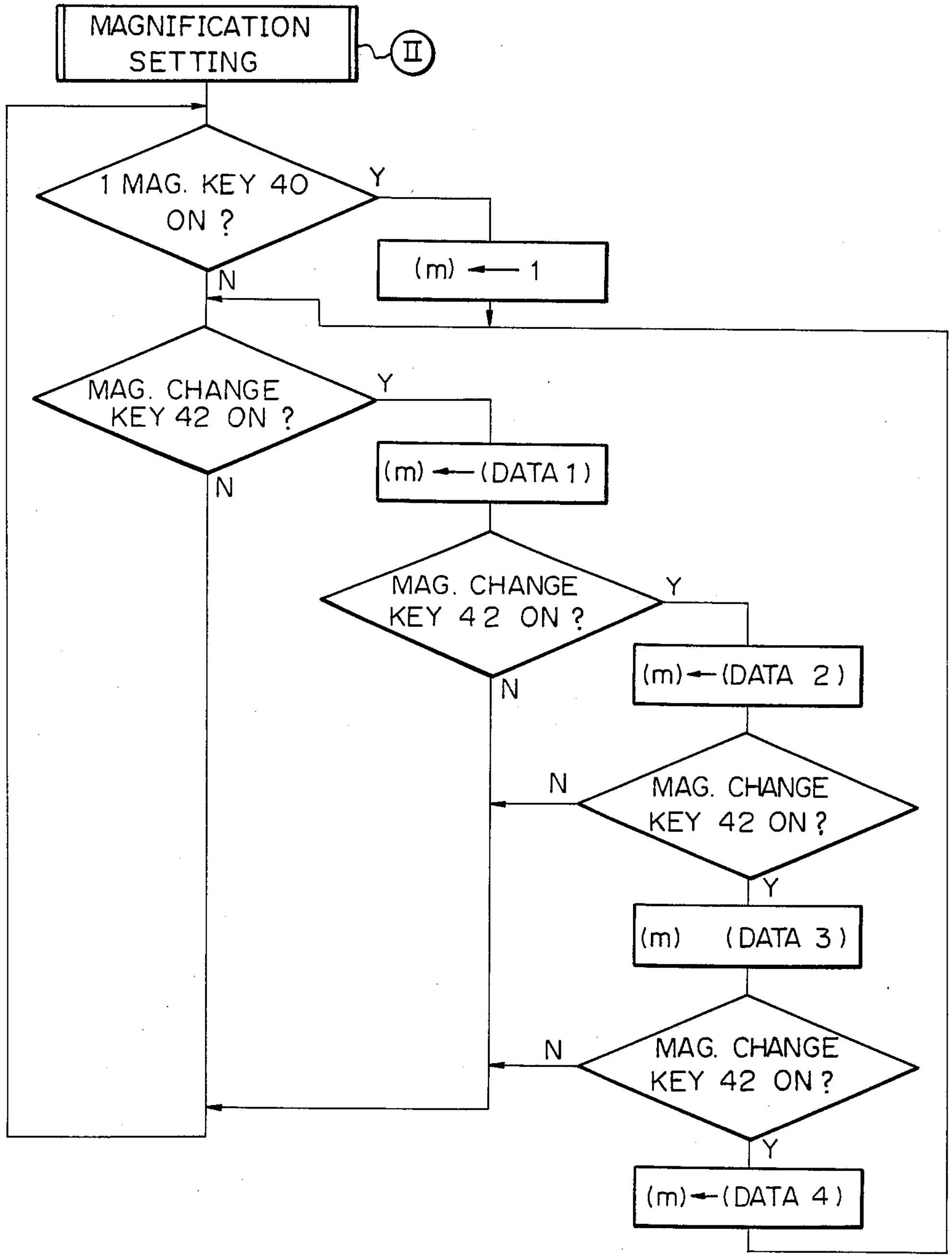
FIG. 5 is a flowchart showing an operation for selecting one of a group of fixed magnifications.
Figure 6:
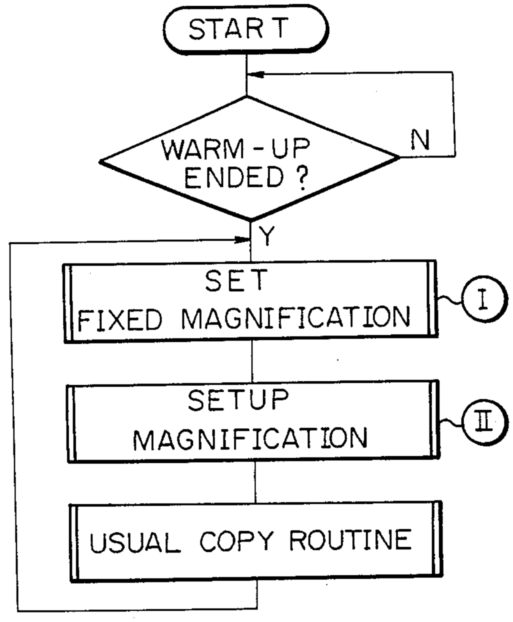
FIG. 6 is a flowchart showing a main routine of the copier as shown in FIG. 1.

The CPU 51, FIG. 2, includes a RAM (Random Access Memory) which stores four different fixed magnification change ratios as DATA1, DATA2, DATA 3 and DATA 4, for each of different formats of paper sheets. To set up a desired magnification, the format of paper sheets selected is sensed first. Then, as shown in FIG. 4, a particular data group corresponding to the sensed format is read out of the RAM of the CPU 51. Subsequently, as shown in FIG. 5, the operator depresses the magnification change key 42 at intervals until desired data appears on the display 43, FIG. 3. Assuming that the format of paper sheets is A, the data group of STEP 1 is selected, as shown in FIG. 4. Then, as shown in FIG. 5, 1. 154 (DATA 1) is selected out of the data group of STEP 1 by the first depression of the key 42, 1. 414 (DATA 2) by the second depression of the key 42, 1. 632 (DATA 3) by the third depression of the key 42, and 2. 000 (DATA 4) by the fourth depression of the key 42. Depressing the key 42 five times returns the data to the first one. After the desired fixed magnification is set up, the print button 31 may be depressed to cause the copying process to start with the desired magnification (see FIG. 6).

Figure 7:
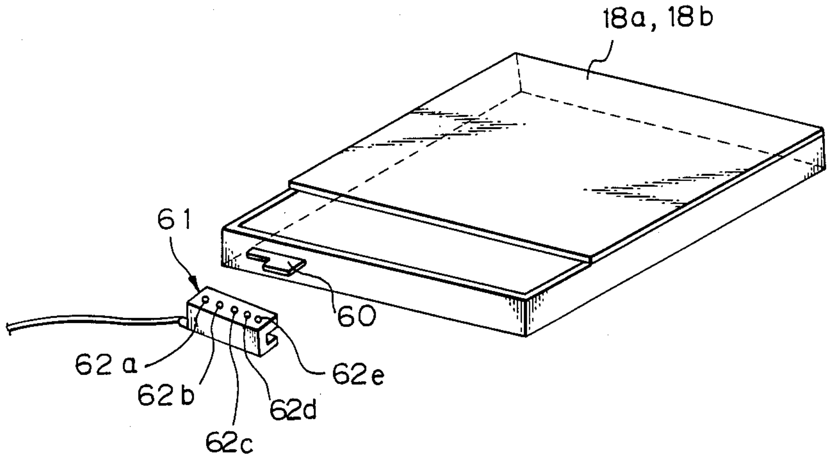
FIG. 7 is a perspective view showing a specific arrangement of a paper size detecting means.

While various different approaches may be contemplated for detecting the format of paper sheets loaded, one example will be described with reference to FIGS. 7 and 8. As shown in FIG. 7, each of the sheet cassettes 18*a* and 18*b* is provided at its end with a flat light interceptor 60 the shape of which differs from one sheet cassette to another. On the other hand, a sensor 61 is located in such a position that an optical path of the sensor 61 is interrupted by the light interceptor 60 when the sheet cassette 18*a* (18*b*) is loaded in a predetermined position, as shown in FIG. 1. The sensor 61 comprises, for example, five phototransistors 62*a* to 62*e*. Which one of the optical paths as defined by the individual phototransistors 62*a* to 62*e* is interrupted by the light interceptor 60 is indicative of a particular one of the sheet cassettes and, therefore, the format of paper sheets stacked in that sheet cassette. Exemplary combinations of sensor outputs and sheet formats are shown in Table 3.

TABLE 3

| | SENSOR (62a~62e) | | | | |
|---|---|---|---|---|---|
| PAPER | a | b | c | d | e |
| A3 | 0 | 0 | 0 | 0 | 1 |
| B4 | 0 | 0 | 0 | 1 | 0 |
| A4 HORIZ | 0 | 0 | 0 | 1 | 1 |
| A4 VERT | 0 | 0 | 1 | 0 | 0 |
| B5 HORIZ | 0 | 0 | 1 | 0 | 1 |
| B5 VERT | 0 | 0 | 1 | 1 | 0 |
| A5 HORIZ | 0 | 0 | 1 | 1 | 1 |
| A5 VERT | 0 | 1 | 0 | 0 | 0 |
| DLT | 1 | 0 | 0 | 0 | 1 |

TABLE 3-continued

| PAPER | SENSOR (62a~62e) | | | | |
|---|---|---|---|---|---|
| | a | b | c | d | e |
| LG | 1 | 0 | 0 | 1 | 0 |
| LT HORIZ | 1 | 0 | 0 | 1 | 1 |
| LT VERT | 1 | 0 | 1 | 0 | 0 |
| HLT HORIZ | 1 | 0 | 1 | 0 | 1 |
| HLT VERT | 1 | 0 | 1 | 1 | 0 |

Figure 8:
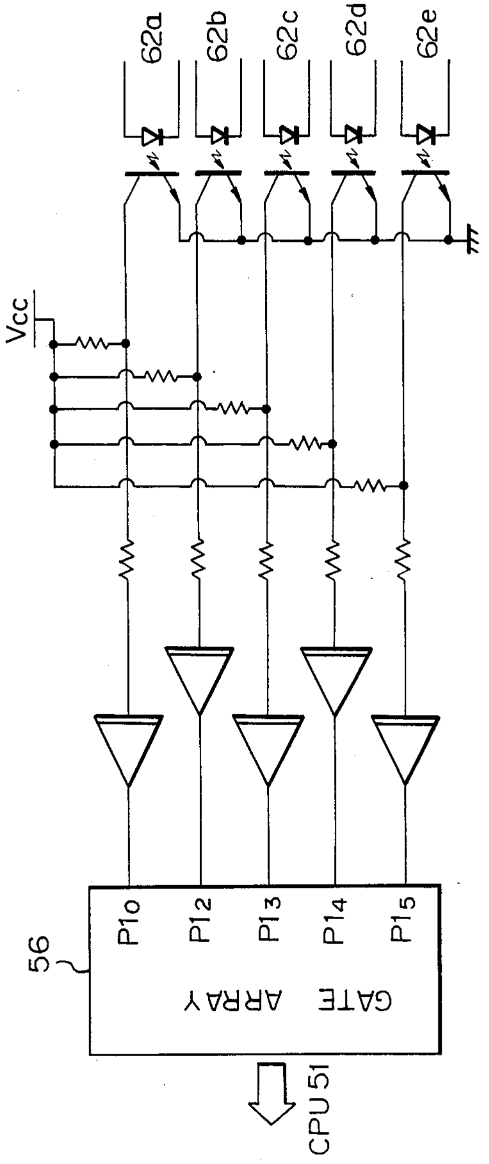
FIG. 8 is a circuit diagram showing the electrical arrangement of the paper size detecting means.

As shown in FIG. 8, the outputs of the phototransistors **62*a* to 62*e* are connected to input terminals P10 to P15 of a gate array 56**.

It is to be noted that although the embodiment has been shown and described in relation to the specific A and B format series, it is similarly applicable to the definite formats as shown in Table 2 and others.

While the procedure shown in FIG. 4 shows data groups each consisting of four different magnifications, such is only illustrative and may be replaced with any other desired number of magnifications. However, considering the fact that the operator sequentially changes the magnification by depressing the magnification change key 42 at intervals, too many magnifications would force the operator to troublesome manipulation.

In summary, it will be seen that the present invention provides a magnification changing device for a copier which frees an operator from awkward manipulation of buttons otherwise needed for the selection of a magnification and, yet, promotes rapid selection of a magnification.

Various modifications will become possible for those skilled in the art after receiving the teachings of the present disclosure without departing from the scope thereof.

What is claimed is:

1. A magnification selecting device for a copier, comprising:

a sheet format detecting means for detecting a format of paper sheets which are loaded in the copier;

a magnification storing means for storing a plurality of different kinds of fixed magnifications which individually correspond to different formats of paper sheets;

a magnification selection control means for selecting the fixed magnifications corresponding to a particular format of sheets out of said magnification storing means, based on sheet format information which is fed from said sheet size detecting means; and a magnification change switch for commanding a copying operation based on one of the fixed magnifications which are selected by said magnification selection control means.

* * * * *